United States Patent
Das et al.

(10) Patent No.: US 7,584,458 B2
(45) Date of Patent: Sep. 1, 2009

(54) SOURCE CODE ANNOTATION LANGUAGE

(75) Inventors: Manuvir Das, Kirkland, WA (US);
Manuel Alfred Fahndrich, Seattle, WA (US); Ramanathan Venkatapathy, Redmond, WA (US); Daniel W. Weise, Kirkland, WA (US); William Hunter Hudson, Kirkland, WA (US); Sameet Harishanker Agarwal, Redmond, WA (US); William Hiroaki Shihara, Redmond, WA (US); Hannes Ruescher, Palo Alto, CA (US); Spencer Wong Low, Bellevue, WA (US); F. Soner Terek, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 657 days.

(21) Appl. No.: 10/679,254

(22) Filed: Oct. 2, 2003

(65) Prior Publication Data

US 2005/0076331 A1   Apr. 7, 2005

(51) Int. Cl.
  *G06F 9/44* (2006.01)
  *G06F 11/00* (2006.01)
  *G06F 12/14* (2006.01)
(52) U.S. Cl. .................. 717/126; 726/25; 714/38
(58) Field of Classification Search ............ 717/126; 714/38; 726/25
See application file for complete search history.

(56) References Cited

U.S. PATENT DOCUMENTS

| | | | |
|---|---|---|---|
| 5,822,588 A | * | 10/1998 | Sterling et al. ............ 717/131 |
| 5,970,490 A | | 10/1999 | Morgenstern |
| 6,442,750 B1 | * | 8/2002 | Lopes et al. ............... 717/126 |
| 7,013,458 B2 | * | 3/2006 | Bloch et al. ............... 717/143 |
| 2003/0041288 A1 | * | 2/2003 | Kolawa et al. .............. 714/38 |
| 2003/0110472 A1 | | 6/2003 | Alloing et al. |
| 2006/0123017 A1 | | 6/2006 | Berg et al. |
| 2006/0271917 A1 | | 11/2006 | Das et al. |
| 2006/0294502 A1 | | 12/2006 | Das et al. |

OTHER PUBLICATIONS

Bertrand Meyer, "Eiffel: Programming for Reusability and Extendibility," Feb. 1987, ACM, SIGPLAN Notices, vol. 22, No. 2, pp. 85-94.*

Bertrand Meyer, "Object-oriented software construction," 2nd ed., Prentice Hall PTR, Upper Saddle River, NJ, 1997, pp. i, ii, 331-410.*

Pedro Guerreiro, "Simple Support for Design by Contract in C++," Proceedings of the 39th International Conference and Exhibition on Technology of Object-Oriented Languages and Systems (TOOLS39), IEEE, 2001, pp. 24-34.*

(Continued)

*Primary Examiner*—Eric B Kiss
(74) *Attorney, Agent, or Firm*—Klarquist Sparkman, LLP

(57) ABSTRACT

Techniques and tools for implementing a source code annotation language are described. In one aspect, keywords are added to a function interface to define a contract for the function independent of function call context. In another aspect, annotations are inserted at global variables, formal parameters, return values, or user-defined types. The annotations include, for example, properties and qualifiers. A property can indicate, for example, a characteristic of a buffer. In another aspect, an annotation indicates that a value has usability properties sufficient to allow a function to rely on the value, where the usability properties depend on value type.

24 Claims, 3 Drawing Sheets

OTHER PUBLICATIONS

"Statistically Detecting Likely Buffer Overflow Vulnerabilities," *2001 USENIX Security Symposium*, Washington D.C., 5 pp. (Aug. 2001).

Evans, "Static Detection of Dynamic Memory Errors," *SIGPLAN Conf. on Programming Language & Design Implementation*, Philadelphia, 10 pp. (May 1996).

Edwards, "Black-Box Testing Using Flowgraphs: An Experimental Assessment of Effectiveness and Automation Potential," *Software Testing, Verification and Reliability*, vol. 10, No. 4, pp. 249-262 (Dec. 2000).

Horning, "The Larch Shared Language: Some Open Problems," *Compass/ADT Workshop*, Oslo, Norway, 16 pp. (Sep. 1995).

Wahls et al., "The Direct Execution of SPECS-C++: A Model-Based Specification Language for C++ Classes," *Technical Report TR94-02b, Iowa State University Department of Computer Science*, 52 pp. (Nov. 18, 1994).

"Scalable Program Analysis," *Internet*, http://research.microsoft.com/spa/, 3 pp. (downloaded on Sep. 5, 2003).

Khurshid, et al., "An Analyzable Annotation Language," *OOPSLA '02*, Seattle, Washington, 15 pp. (Nov. 2002).

Leavens et al., "Preliminary Design of JML," *Technical Report 98-06v, Iowa State University Department of Computer Science*, 94 pp. (Jun. 1998-2003; revised May 2003).

Leino, "Checking correctness properties of object-oriented programs," *Internet*, http://research.microsoft.com/leino/papers/1, 49 pp. (Aug. 19, 2002).

Kramer, "Examples of Design by Contract in Java Using Contract, the Design by Contract™ Tool for Java™," *Object World Berlin '99, Design & Components*, 26 pp. (May 17-20, 1999).

Dor, et al., "CSSV: Towards a Realistic Tool for Statically Detecting All Buffer Overflows in C,"*PLDI'03*, San Diego, California, pp. 155-167 (Jun. 9-11, 2003).

Foster et al., "A Theory of Type Qualifiers," *Proc. ACM SIGPLAN '99 Conf. on Programming Language and Design Implementation (PLDI)*, Atlanta, Georgia, 12 pp. (May 1999).

Guyer et al., "An Annotation Language for Optimizing Software Libraries," *Proc. Second Conf. on Domain Specific Languages*, Austin, Texas, 14 pp. (Oct. 1999).

Dor et al., "Cleanness Checking of String Manipulations in C Programs via Integer Analysis," *Proc. 8th Int'l Static Analysis Symposium*, 19 pp. (Jun. 2001).

Leavens et al., "Enhancing the Pre- and Postcondition Technique for More Expressive Specifications," *Proc. World Congress on Formal Methods in the Development of Computing Systems*, Toulouse, France, 21 pp. (Sep. 1999).

Evans et al., "LCLint: A Tool for Using Specifications to Check Code," *SIGSOFT Symposium on the Foundations of Software Engineering*, 10 pp. (Dec. 1994).

Evans et al., "Splint Manual, Version 3.1.1-1," *Secure Programming Group, University of Virginia Department of Computer Science*, 121 pp. (Jun. 5, 2003).

Evans et al., "Improving Security Using Extensible Lightweight Static Analysis," *IEEE Software*, pp. 42-51 (Jan./Feb. 2002).

Evans, "Using Specifications to Check Source Code," *TR-628, MIT Lab for Computer Science*, 97 pp. (Jun. 1994).

Bush et al, "A static analyzer for finding dynamic programming errors," *Software: Practice and Experience*, pp. 775-802 (2000).

Alur et al., "Synthesis of Interface Specifications for Java Classes," Proceedings of the 32nd ACM Symposium on Principles of Programming Languages, 12 pp. (Jan. 2005).

Ammons et al., "Mining Specifications," In Proceedings of the 29th ACM Symposium on Principles of Programming Languages, Berlin, 13 pp. (2002).

Burdy et al., "An Overview of JML Tools and Applications," Software Tools for Technology Transfer, 21 pp. (Dec. 2004).

Das et al., "ESP: Path-Sensitive Program Verification in Polynomial Time," Proceedings of the 2002 ACM SIGPLAN Conference on Programming Language Design and Implementation (2002).

Deline et al., "Typestates for Objects," ECOOP 04: 18th European Conf. On Object-oriented Programming, 26 pp. (Jun. 2004).

Detlefs et al., "Extended Static Checking," Compaq Systems Research Center, Research Report 159, 50 pp. (1998).

Ernst et al., "Dynamically Discovering Likely Program Invariants to Support Program Evolution," IEEE Transactions in Software Engineering, 27(2):99-123 (2001).

Evans, "LCLint User's Guide, Version 2.5," U. of Virginia Dept. Of Computer Science, 102 pp. (May 2000).

Flanagan et al., "Extended Static Checking for Java," Proceedings of the 29th ACM Symposium on Principles of Programming Languages, Berlin, 12 pp. (2002).

Flanagan et al., "Houdini, an Annotation Assistant for ESC/Java," Symposium of Formal Methods, 18 pp. (2001).

Foster et al., "Flow-Sensitive Type Qualifiers," Proc. of the SIGPLAN 2002 Conf. on Programming Language Design and Implementation, Berlin, 12 pp. (2002).

Horn, "On Sentences Which are True of Direct Unions of Algebra," Journal of Symbolic Logic, 16(1):14-21 (1951).

Jackson, "Alloy: A Lightweight Object Modelling Notation," ACM Transactions on Software Engineering and Methodology, 11(2):256-290 (Apr. 2002) [document dated Nov. 27, 2001].

Larochelle and Evans, "Statically detecting likely buffer overflow vulnerabilities," Proceedings of the 10th conference on USENIX Security Symposium, 14 pp. (Aug. 2001).

Microsoft Corp., "Platform SDK: Microsoft Interface Definition Language (MIDL), Struct Attribute," 2 pp. [Downloaded from the World Wide Web on May 14, 2005] (document dated Mar. 2005).

Microsoft Corp., "Platform SDK: Microsoft Interface Definition Language (MIDL), Out Attribute," 2 pp. [Downloaded from the World Wide Web on May 16, 2005] (document dated Mar. 2005).

Microsoft Corp., "Platform SDK: Remote Procedure Call (RPC)," 1 p., [Downloaded from the World Wide Web on May 10, 2005] (document dated Mar. 2005).

Nimmer et al., "Static Verification of Dynamically Detected Program Invariants: Integrating Daikon and ESC/Java," Proc. of RV'01, First Workshop on Runtime Verifications, 22 pp. (2001).

Reps et al., "Precise Interprocedural Dataflow Analysis via Graph Reachability," Conference Record of the 22nd ACM Symposium on Principles of Programming Languages, 13 pp. (1995).

Reps, "Demand Interprocedural Program Analysis Using Logic Databases," Workshop on Programming with Logic Databases, ILPS, 34 pp. (1993).

Shankar et al., "Detecting Format String Vulnerabilities with Type Qualifiers," Proc. of the 10th USENIX Security Symposium, 16 pp. (2001).

"Splint—Release 3.0.1," 2 pp. (document dated Jan. 2002-Jul. 2007) [downloaded from the World Wide Web on Aug. 8, 2007].

Wahls et al., "The Direct Execution of SPECS-C++: A Model-Based Specification Language for C++ Classes," Technical Report TR94-02b, Iowa State University Department of Computer Science, 52 pp. (Nov. 18, 1994).

Whaley et al., "Automatic Extraction of Object-Oriented Component Interfaces," Proc. of the 2002 ACM SIGSOFT Int'l Symposium on Software Testing and Analysis, 11 pp. (2002) [document dated 2001].

Whaley et al., "Cloning-Based Context-Sensitive Pointer Alias Analysis Using Binary Decision Diagrams," Proc. of the SIGPLAN 2004 Conf. on Programming Language Design and Implementation, 14 pp. (Jun. 2004).

Yang et al., "MECA: an Extensible, Expressive System and Language for Statically Checking Security Properties," Proc. of the 10th ACM Conf. on Computer and Communications Security, Washington, D.C., 14 pp. (2003).

Zhang et al., "Using CQUAL for Static Analysis of Authorization Hook Placement," Proc of the 11th USENIX Security Symposium (Aug. 2002) [document dated May 2002].

\* cited by examiner

SOURCE CODE ANNOTATION LANGUAGE

TECHNICAL FIELD

The invention relates generally to computer programming languages, and more particularly relates to annotating source code.

BACKGROUND

As computer programs have become increasingly complex, the challenges of developing reliable software have become apparent. Modern software applications can contain millions of lines of code written by hundreds of developers, each with different sets of programming skills and styles. Debugging such applications is therefore a daunting task.

The basic concepts of software engineering are familiar to those skilled in the art. FIG. 1 shows a technique 100 for creating a computer program according to the prior art. First, at 110, a program is created/edited by one or more developers. Then, at 120, the program is debugged (e.g., using a debugging tool). At 130, if the program contains bugs to be fixed, the editing/debugging cycle continues. When the source code for a program is determined to be sufficiently bug-free, the source code is compiled into executable target code. FIG. 2 shows a block diagram of a system for compiling source code according to the prior art. A compiler 200 compiles source code written in a high-level language in source files 205 into target code 210 for execution on a computer. The target code 210 can be hardware-specific or generic to multiple hardware platforms. The compiler 200 can use, for example, lexical analysis, syntax analysis, code generation and code optimization to translate the source code into executable code. In addition, many compilers have debugging capabilities for detecting and describing errors at compile time.

The size and complexity of most commercially valuable software applications have made detecting every programming error (or "bug") in such applications nearly impossible. To help manage software development and debugging tasks and to facilitate extensibility of large applications, software engineers have developed various techniques of analyzing, describing and/or documenting the behavior of programs to increase the number of bugs that can be found before a software product is sold or used.

For example, in one technique, source code is instrumented with additional code useful for checking expressions in C programs to determine whether each instance of a particular kind of program operation (string manipulations) is safe. The instrumentation is analyzed at compile time to assess the "cleanness" of each string manipulation. See Dor et al., "Cleanness Checking of String Manipulations in C Programs via Integer Analysis," *Proc. 8th Int'l Static Analysis Symposium* (June 2001).

In other techniques, program specifications are written in specification languages that use different keywords and syntactic structures to describe the behavior of programs. Some specifications can be interpreted by compilers or debugging tools, helping to detect bugs that might not otherwise have been detected by other debugging tools or compilers. See, e.g., Evans et al., "LCLint: A Tool for Using Specifications to Check Code," *SIGSOFT Symposium on Foundations of Software Engineering* (December 1994).

Some specification languages define "contracts" for programs that must be fulfilled in order for the program to work properly. See, e.g., Leavens and Baker, "Enhancing the Pre- and Post-condition Technique for More Expressive Specifications," *Proc. World Congress on Formal Methods in the Development of Computer Systems* (September 1999). In general, a contract refers to a set of conditions. The set of conditions may include one or more preconditions and one or more postconditions. Contracts can be expressed as mappings from precondition states to postcondition states; if a given precondition holds, then the following postcondition must hold.

Preconditions are properties of the program that hold in the "pre" state of the callee (i.e., at the point in the execution when control is transferred to the callee). They typically describe expectations placed by the callee on the caller. Callers must guarantee that preconditions are satisfied, whereas callees may rely on preconditions, but not make any additional assumptions. Postconditions are properties of the program that hold in the "post" state of the callee (i.e., at the point in the execution when control is transferred back to the caller). They typically describe guarantees made to the caller by the callee. Callees must guarantee that postconditions are satisfied, whereas callers may rely on postconditions but may not make any additional assumptions.

Although many different specification languages have been previously developed, they tend to have shortcomings that fall into two categories. In some cases, specification languages are so complex that writing the specification is similar in terms of programmer burden to re-writing the program in a new language. This can be a heavy burden on programmers, whose primary task is to create programs rather than to describe how programs work. In other cases, specification languages are less complex but not expressive enough to describe the program in a useful way or to allow detection of a desirable range of errors.

Whatever the benefits of previous techniques, they do not have the advantages of the following tools and techniques.

SUMMARY

Techniques and tools for implementing a source code annotation language are described. The source code annotation language uses contracts that define mappings from precondition states required to be satisfied by callers to postcondition states that can be relied upon by callees. The source code annotation language provides a framework for explicitly defining property and qualifier annotations in source code. For example, the properties in the language include keywords that describe how much space in a buffer is allocated, and how much of a buffer is initialized. These properties are useful for detecting buffer overruns.

In one aspect, one or more keywords are added to a function interface in computer program code, where the keywords define a code invocation contract for the function, the code invocation contract having one or more contract requirements (e.g., a postcondition or precondition) independent of function call context.

In another aspect, one or more code annotations are inserted at one or more annotation targets. Each of the annotation targets is of an annotation target category. Annotation target categories include: global variable, formal parameter of a function, return value of a function, user-defined data type. The code annotations can include a property, an annotation prefix (e.g., a qualifier), etc. A property can be a read only property, a return value property, etc. A property can indicate, for example, a location of a buffer pointer or characteristic of a buffer (e.g., a readable extent or writable extent of a buffer). A qualifier can be a precondition qualifier, a postcondition qualifier, etc. A dereference prefix can be used to specify properties of an object referenced by a reference parameter. The inserted annotations also can include default annotations.

In another aspect, an annotation is inserted at a value in program code. The value (e.g., a formal parameter of a function, a return value, etc.) has a value type (e.g., scalar, void, pointer, user-defined type, struct, etc.). The annotation is a keyword indicating that the value has usability properties sufficient to allow a function to rely on the value, where the usability properties depend on the value type. For example, if the value is a pointer, and an object pointed to by the pointer has one or more readable elements, the readable elements of the object each have usability properties sufficient to allow a function to rely on the one or more readable elements. The value also can be a reference parameter.

In another aspect, an annotation having an argument is inserted in program code. The annotation annotates a value having a first value type, and usability properties of the value are dependent on the first value type. The annotation indicates that the value has usability properties that depend on the properties of a second value type denoted by the argument of the annotation. For example, the first value type can be a legacy value type.

In another aspect, an annotation describing a characteristic of a buffer is added to program code. For example, the annotation indicates the extent to which the buffer is readable or writable. A size parameter is included with the annotation. The size parameter describes a portion of the buffer to which the characteristic applies. The size parameter is operable to describe the portion of the buffer using a size specification selected from a group of plural different size specifications (e.g., byte count, element count, end pointer location, internal pointer location, sentinel position).

In another aspect, an annotation comprising an arrangement of lexical components is added to program code. The arrangement consists of an optional precondition qualifier or postcondition qualifier; followed immediately thereafter by an optional exception qualifier; followed immediately thereafter by one or more optional dereference qualifiers; followed immediately thereafter by a property.

In another aspect, a computer programmed as a source code annotation system comprises a memory storing program code for the source code annotation system and a processor for executing the program code. The program code is for instructing a computer to add one or more annotations to one or more annotation targets in high-level language source code (e.g., source code in an object-oriented programming language). The annotations each comprise an arrangement of one or more lexical components, the arrangement consisting of an optional precondition qualifier or postcondition qualifier, followed immediately thereafter by an optional exception qualifier, followed immediately thereafter by one or more optional dereference qualifiers, followed immediately thereafter by a property.

Additional features and advantages of the invention will be made apparent from the following detailed description which proceeds with reference to the accompanying drawings.

DETAILED DESCRIPTION

The following description is directed to techniques and tools for implementing a source code annotation language. The techniques and tools allow simple yet expressive annotation of source code to assist developers and detecting bugs and developing reliable source code.

Figure 1:
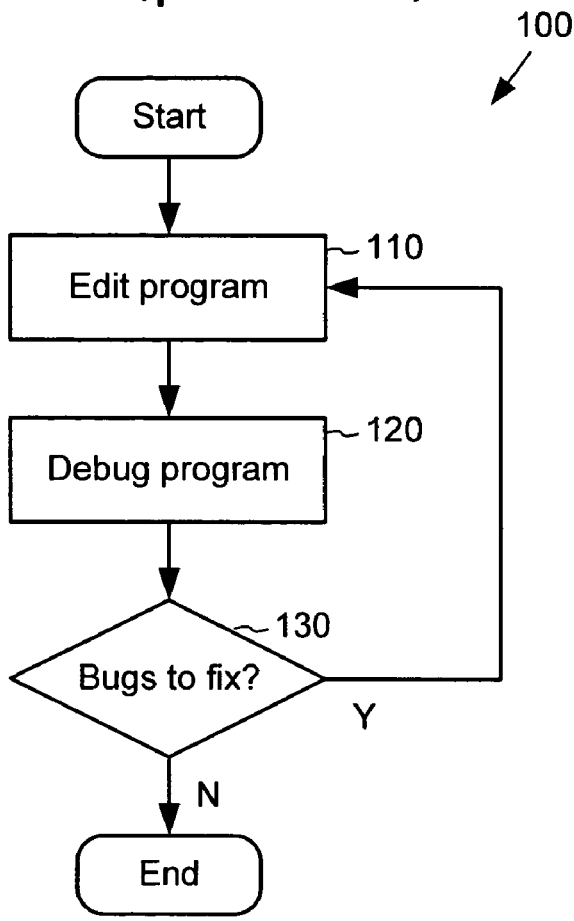
FIG. 1 is a flow diagram of a technique for creating a computer program according to the prior art.
Figure 2:
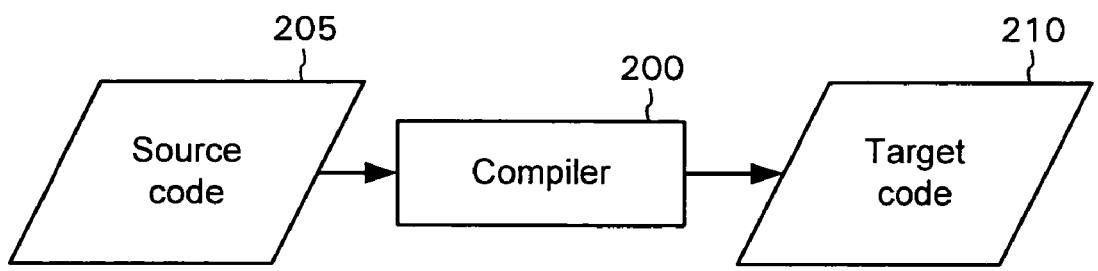
FIG. 2 is a block diagram of a system for compiling source code according to the prior art.
Figure 3:
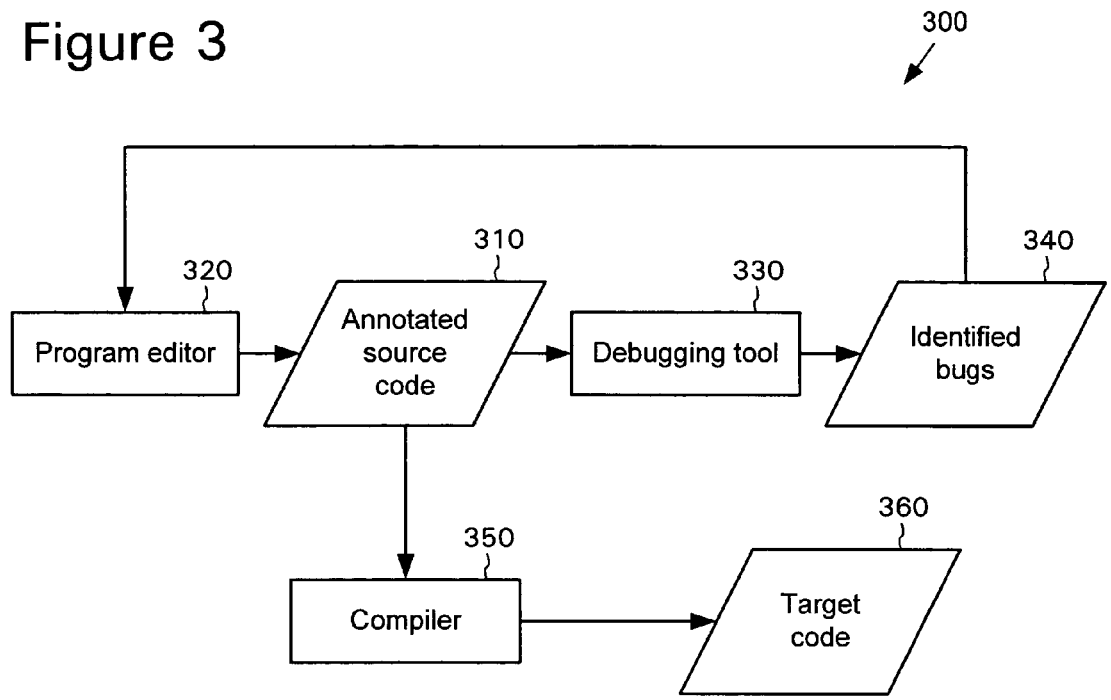
FIG. 3 is a block diagram of a source code annotation system.

FIG. 3 is a block diagram of a source code annotation system 300. The system 300 is designed to produce annotated source code 310 useful for producing a high-quality final software product. For example, a developer uses a program editor 320 to create annotated source code 310 using a source code annotation language. The developer can debug the annotated source code 310 using a debugging tool 330. The annotations in the annotated source code 310 allow detection of a broad range of bugs that may be present in the source code. From a list of identified bugs 340, a developer can edit the source code using the program editor 320. The annotations in the annotated source code 310 allow the iterations of the editing/debugging cycle to be more productive. When debugging is complete, the developer can use a compiler 350 to compile the source code into target code using a compiler 360. For example, the compiler 360 can ignore annotations in the annotated source code during compilation. As another example, the developer may use a compiler that can take the annotations as input and perform further error-checking analysis at compile time. The compiler 360 and the debugging tool 330 may alternatively be included in a combined debugging/compiling application.

I. Source Code Annotation Language

The source code annotation language techniques and tools described herein allow programmers to explicitly state the contracts between implementations (callees) and clients (callers) that are implicit in the source code. Explicitly stated preconditions and postconditions are useful because it is possible to build compile-time or run-time checkers that check the code of called functions (callees) and calling functions (callers) and report violations of preconditions and postconditions.

As explained above, preconditions typically describe expectations placed by the callee on the caller. For example, a called function may require that a calling function not pass in a null pointer in a case where the called function expects to be able to dereference the passed-in pointer. As another example, a called function may require a buffer parameter to have a certain number of readable bytes in a case where the called function expects to be able to read that many bytes; the caller must guarantee that the buffer can be read to that point. Postconditions typically describe guarantees made to the caller by the callee. For example, a calling function may require that the called function will not return a null pointer as a return value.

Some versions of the source code annotation language use a restricted set of contracts. In particular, preconditions and postconditions do not depend on the context of particular function calls. An indicated precondition must hold on every invocation of a callee to which the indicated precondition applies, and an indicated postcondition must be satisfied by the callee on every invocation to which the indicated postcondition applies. In such versions, the source code annotation language does not allow "conditional" postconditions—postconditions that only apply if some other condition is satisfied.

Alternatively, versions of the source code annotation language could include a richer set of contracts.

A. Annotations

Annotations are statements about the state of a program. The source code annotation language allows the placement of annotations on certain program artifacts called annotation targets. Categories of annotation targets include global variables (i.e., "globals"), formal parameters of functions, return values of functions, and user defined types (typedefs). In some versions of the source code annotation language, placement of annotations in source code is limited to these categories of annotation targets. Alternatively, the source code annotation language could allow the placement of annotations on other program artifacts, including call sites and arbitrary expressions. For example, annotations could be placed at arbitrary points in the control flow of the program to make assertions about the execution state, or on arbitrary data structures to make statements about invariants (i.e., properties of the data structure that always hold).

In order to support contracts, the source code annotation language provides precondition and postcondition annotations. Precondition and postcondition annotations are placed on individual parameters or on the return value. For example, in the function prototype void func(pre deref notnull int **ppvr)

the keyword sequence pre deref notnull is considered to be one annotation consisting of two qualifiers (pre and deref) and a property (notnull). (Qualifiers and properties are described in greater detail below.) The annotation is placed on the formal parameter ppvr of function func. In general, any number of annotations may appear on an annotation target.

Some versions of the source code annotation language allow default annotations. Default annotations apply recursively to all positions reachable by dereference operations. The role of default annotations is to give unambiguous meaning to un-annotated or partially annotated functions. Default annotations make it possible to write tools that insert default annotations for un-annotated program artifacts. Checking tools may behave differently depending on whether an annotation that matches an appropriate default was placed explicitly in the code by the programmer. For such checking tools, prior insertion of default annotations may lead to different checking results.

1. Annotation Structure

The source code annotation language includes two kinds of annotation elements (properties and qualifiers) that have well-defined, unambiguous meanings. As the example above illustrates, a single annotation may consist of several annotation elements. The general structure of an annotation is as follows:

annot::=[pre|post][except][deref*]p

In this structure, an annotation consists of an optional pre or post qualifier, followed by an optional except qualifier, followed by any number of optional deref qualifiers, and ending in a property p. This annotation structure can be varied as to the order of the annotation elements, the optional nature of various elements, etc. Other variations on this structure are also possible.

The sections below detail the meaning of these qualifiers and a set of defined properties.

2. Qualifiers

A qualifier is a keyword that acts as a prefix of an annotation. Table 2 below lists qualifiers that modify or disambiguate the next annotation in a sequence of annotations.

TABLE 2

The pre, post, and deref qualifiers

| Qualifier | Meaning |
| --- | --- |
| pre | Prefixes an annotation to make it apply in the precondition state. |
| post | Prefixes an annotation to make it apply in the postcondition state. |
| deref | Annotates a pointer. The prefixed annotation applies one dereference down in the type. For example, if p points to a buffer, then the prefixed annotation applies to all elements in the buffer. If p is a pointer to a struct, the next annotation applies to all fields of the struct. |

The pre and post qualifiers indicate whether a property is a precondition property or a postcondition property. In some versions of the source code annotation language, properties of parameters apply in the "pre" state by default, whereas properties of the return value apply in the "post" state by default. The qualifiers pre and post are used to override these defaults.

The deref qualifier can be used to describe properties of objects that are reachable through one or more dereference operations on a formal parameter. In some versions of the language, reference parameters are treated like pointers. Annotations on a reference parameter apply to the reference itself; an explicit deref must be used in order to specify properties of the referenced object.

Requiring an explicit deref qualifier to specify properties for a referenced object allows placement of annotations on the reference itself (e.g., by withholding the deref qualifier in an annotation on a reference). This requirement allows the same annotations to be used whether a function receives a reference to an object or a pointer to the object. This requirement also ensures consistency with compilers that insert explicit dereference operations on uses of references. Alternatively, an implicit deref can be introduced on all annotations on the reference. The implicit deref treatment may be more natural for developers.

Alternatively, a dereferencing qualifier could support more general access paths, such as field references.

Table 3 below describes the except qualifier, which can modify or disambiguate an entire sequence of annotations.

TABLE 3

The except qualifier

| Qualifier | Meaning |
| --- | --- |
| except | Given a set of annotations Q containing except maybeP, the effect of except maybeP is to erase any occurrences of P or notP (explicit or implied) within Q at the same level of dereferencing as except maybeP, and to replace them with maybeP. |

The except qualifier is an override that is useful in situations where macros are used to combine multiple properties, and two macros that are placed on the same program artifact conflict on some property. This situation occurs frequently in annotated code.

Qualifiers need not be limited to the set of qualifiers described above. The source code annotation language may employ additional qualifiers, omit some qualifiers, vary the definitions of certain described qualifiers, etc.

3. Properties

Properties are statements about the execution state of a program at a given point. Properties describe characteristics of their corresponding annotation targets in the program. In some versions of the source code annotation language, properties are not dependent on particular checking tools or particular uses (e.g., compile-time checking, run-time checking, test-generation, etc.).

A property P has corresponding properties notP and maybeP. Where P indicates that a given property holds, notP indicates that the property does not hold, and maybeP indicates that the property may or may not hold. The source code annotation language can use maybeP as a default for un-annotated program artifacts.

Predefined properties relating two parameters (for instance, a buffer and its size) are placed on one of the parameters and the name of the other parameter is given as an argument to the attribute.

a. Basic Properties

Some versions of the source code annotation language include three basic properties: null, readonly, and checkReturn. These three properties can be used to annotate a pointer, the contents of a location, and a return value, respectively. The meanings of these three properties are described below in Table 4.

TABLE 4

Basic properties

| Property | Meaning |
| --- | --- |
| null | Annotates a pointer. States that the pointer is null. |
| readonly | Annotates the contents of a location. States that the location is not modified after this point. If the annotation is placed on the precondition state of a function, the restriction only applies until the postcondition state. By default, all un-annotated locations are maybereadonly, that is, callers must assume the value may change. |
| checkReturn | Annotates a return value. States that the caller should inspect the return value. |

As stated in Table 4, readonly is placed on the contents of a location. For example, for a function interface foo(char *x), foo(deref readonly char *x)

states that the contents of the char buffer pointed to by the formal parameter x cannot be modified. Although readonly is similar in meaning to the language construct const, readonly provides an additional benefits in that it can be used to annotate legacy interfaces on which constness cannot be specified without breaking applications, and it is sometimes more flexible than const (e.g., for describing constness of a recursive data structure parameter).

b. Buffer Properties

Languages such as C and C++ have no built in concept of buffers or buffer lengths. Therefore, some versions of the source code annotation language include annotations to state assumptions about how much space in a buffer is allocated and how much of a buffer is initialized. Such annotations include two main properties for buffers: the extent to which the buffer is writable (writableTo) and the extent to which the buffer is readable (readableTo). By stating assumptions about writableTo and readableTo extents at function prototypes, these annotations allow improved static checking of source code for buffer overruns. The writableTo and readableTo properties are described below in Table 5.

TABLE 5

The writableTo and readableTo properties

| Property | Meaning |
| --- | --- |
| writableTo(size) | Annotates a buffer pointer. If the buffer can be modified, size describes how much of the buffer is writable (usually the allocation size). For a writer of the buffer, this is an explicit permission to write up to size, rather than a restriction to write only up to size (Possible size descriptions are described below.) |
| readableTo(size) | Annotates a buffer pointer. If the buffer can be read, size describes how much of the buffer is readable. For a reader of the buffer, this is an explicit permission to read up to size, rather than a restriction to read only up to size. |
| aliased(location) | Annotates a buffer pointer and states that the pointer points into the same logical buffer as location. The pointers need not be equal. |

The writableTo property describes how far a buffer can be indexed for a write operation (provided that writes are allowed on the buffer to begin with). In other words, writableTo describes how much allocated space is in the buffer. On the other hand, the readableTo property describes how much of a buffer is initialized and, therefore, how much of the buffer can be read.

Figure 4:
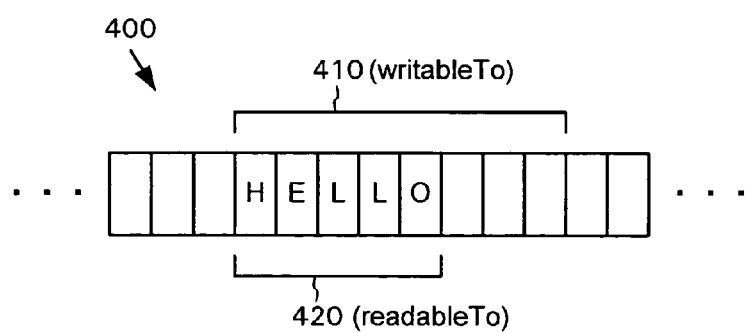
FIG. 4 is a diagram of a buffer having a writableTo property and a readableTo property.

A buffer returned from an allocation function (e.g., malloc) starts out with a known writableTo extent given by the allocation size, but the readableTo extent is empty. As the buffer is gradually initialized, the readableTo extent grows. For example, FIG. 4 is a diagram of a buffer 400 having a writableTo property and a readableTo property. The buffer 400 has allocated eight bytes allocated, indicated by the bracket labeled 410. The extent to which the buffer 400 as shown is currently writableTo is eight bytes. Part of the buffer 400 has been initialized and contains the characters H-E-L-L-O. The bytes containing these characters constitute the readableTo extent (indicated by bracket 420) of the buffer 400.

The size argument of writableTo and readableTo can have several forms (i.e., size specifications). These are explained using the BNF grammar in Tables 7A-7C below. This grammar also describes location, which the property aliased (described below) also can take as an argument. For the purposes of this grammar, non-terminals are in italics, whereas literals are in regular font.

TABLE 7A size argument grammar

| size | ::= | [pre|post] sizespec | The optional pre or post qualifier overrides the default store used to compute sizespec. The default store is the same store in which the enclosing readableTo or writableTo annotation is interpreted. |

TABLE 7B sizespec grammar

| | | |
|---|---|---|
| sizespec | ::= byteCount(number) | The size is given as a byte count. |
| | \| elementCount(number) | The size is given as an element count. The size in bytes can be obtained by multiplying by the element size. |
| | \| elementCount(number, elemsize) | The size is given as an element count. elemsize is a constant overriding the element size given by the C/C++ type. Useful for legacy interfaces with void*. |
| | \| endpointer(location) | The size is given as an end pointer. The size in bytes can be obtained by subtracting the buffer pointer from location, and multiplying by the element size. |
| | \| internalpointer(location) | The size is given as an internal pointer. endpointer and internalpointer provide the same information on readable and writable extent, but provide different information on the relative position of the two pointers. The distinction is useful when internalpointer is used as a refinement of the aliased property. |
| | \| sentinel(constant-int) | The size is given by the position of the first occurrence of a sentinel value, starting at the element pointed to by the buffer pointer. constant-int is the sentinel value (usually 0). The size in bytes can be obtained by subtracting the buffer pointer from the pointer to the first occurrence of the sentinel value, adding 1, and multiplying by the element size. Implies that there is at least one occurrence of the sentinel value in the buffer. |

TABLE 7C number and location grammar

| | | |
|---|---|---|
| number | ::= constant-int | |
| | \| location | |
| | \| number op number | op is either +, −, *, or /. |
| | \| −number | |
| | \| sizeof(C/C++-type) | The compile-time constant given by the C/C++ sizeof construct. |
| | \| readableBytes(location) | The number is obtained by taking the readable bytes of location, which must denote a buffer. |
| | \| writableBytes(location) | The number is obtained by taking the writable bytes of location, which must denote a buffer. |
| | \| readableElements(location) | The number is obtained by taking the readable elements of location, which must denote a buffer. |
| | \| writableElements(location) | The number is obtained by taking the writable elements of location, which must denote a buffer. |

TABLE 7C-continued number and location grammar

| | | |
|---|---|---|
| location | ::= Variable | Usually a parameter. |
| | \| Return | Special name; refers to the return value. |
| | \| *location | Dereference operation. |

The grammar in Tables 7A-7C presents several semantic possibilities for the size argument. However, not all of the semantic possibilities in this grammar are useful. For example, one can create meaningless numbers by using readableElements to give meaning to a byteCount, and pre and post do not make sense on constant-int. As another example, the return value can only be used with post.

sentinel can be used to indicate null-terminated buffers. For instance, the property readableTo(sentinel(0))

describes a buffer that must contain a 0, and whose readable size extends at least as far as the buffer element that holds the first 0.

The writableTo and readableTo annotations are placed on the buffer pointer. For example, the annotation writableTo (byteCount(10)) can be placed on the buffer pointer for the function interface foo(char * buf) in the following manner:

foo(writableTo(byteCount(10)) char* buf)

The aliased property is useful for transferring buffer properties from one pointer to another. notAliased is useful for guaranteeing that two buffers are not aliased (i.e., that two buffers do not overlap). The aliased property is described in Table 8 below.

TABLE 8

The aliased property

| Property | Meaning |
|---|---|
| aliased(location) | Annotates a buffer pointer and states that the pointer points into the same logical buffer as location. The pointers need not be equal. | endpointer and internalpointer (see Table 7B above) can be used to refine the aliased annotation. aliased(q) on a pointer p states that p and q point into the same buffer. Additionally, readableTo(internalpointer(q)) on a pointer p states that p is less than or equal to q.

Note that there is no explicit annotation to indicate null-terminated buffers. This is because null-terminated buffers are declared using the sentinel size specification.

The definitions of and grammar corresponding to arguments (e.g., size and location) need not be limited to the set of properties described above. Versions of the source code annotation language may employ additional arguments, omit some arguments, vary the definitions of certain described arguments, etc.

c. Valid Values

Values are not always usable. A value that is not usable cannot be relied upon. For instance, if an object of a user-defined type is expected to be a null-terminated string, the object may not be usable when freshly allocated or when passed in from an un-trusted source. (Hereafter, this user-defined type will be referred to as the "AsciiString" type.) The notion of usability/reliability can vary depending on context. For example, in some situations it is important to determine whether a value is usable in a precondition state, while in other situations it is important to determine whether a value is usable in a postcondition state.

The source code annotation language uses the annotation valid to state that a value is usable. valid applies recursively through the type structure. For example, a valid value p of type pointer means that p is not null, and that for any readable element of a pointed-to buffer, the element itself is valid. Conversely, if we know that p is not null, but do not know if p is valid, then we do not know whether the pointed-to elements are valid unless the elements are themselves annotated.

Table 9 below describes the valid property.

TABLE 9

The valid property

| Property | Meaning |
|---|---|
| valid | Annotates any value. States that the value satisfies all usability properties of its type (see Table 10 below). For example, for a string buffer, valid means that the buffer pointer is not null, and the buffer is null-terminated. |

The usability of a value depends on the type of the value (e.g., its declared C/C++ type). For instance, in C/C++, usable values of pointer types should not be null, so that the pointer value may be used in a dereference operation.

Table 10 gives particular interpretations of valid depending on the type of a value v.

TABLE 10

Interpretations of valid for different value types

| typeof(v) | Meaning of valid |
|---|---|
| scalar | initialized |
| void | initialized (void can be treated as a scalar of one byte) |
| T* | notnull<br>AND readableTo(elementCount(1))<br>AND FORALL valid element indices i (given by readableTo) valid(*(v + i)) |
| typedef | Given the following declaration of typedefName<br>typedef $a_1 \ldots a_n$ T typedefName;<br>the meaning of valid is<br>$a_1$ AND a2 AND ... $a_n$ AND valid for typeof(v) = T |
| struct | For all fields f in a struct S: v.f is initialized. (In other versions of the language, a stronger implication could be made that v.f is valid.) |

In some versions of the source code annotation language, single objects of a given type are treated as buffers of the object type of size=1. Therefore, valid pointers point to buffers with at least one readable element. Explicit size annotations may be used to describe pointers to buffers with more than one element.

valid may be used in conjunction with except to eliminate one or more aspects of validity from the annotations on an object. Some examples of using valid in conjunction with except are provided below:

Example 1

(valid except maybenull int *p) states that either p is null or p is valid.

Example 2

(valid deref except maybenull int **p) states that p is valid, and each element in the buffer pointed to by p is either null or valid.

Annotations also can be placed on user-defined abstract data types ("typedefs"). These annotations define what it means to be a valid value of the given type. For example, for the user-defined type AsciiString, the typedef for AsciiString can be annotated to encode the fact that valid AsciiStrings are zero terminated buffers, as follows:

typedef readableTo(sentinel(0)) char * AsciiString;

The set of annotations corresponding to a valid value can be derived transitively through typedefs in the source code. For example, valid AsciiStrings can have the annotation readableTo(Sentinel(0)), as well as all of the annotations on values of type char *.

Annotations on typedefs make it possible for programmers to define their own abstract types with customized notions of validity.

d. Overriding the Declared Type

In some cases, the interpretation of valid derived from the declared C/C++ type of a parameter may be inappropriate. This may be because the C/C++ declared type on a function signature is imprecise, outdated, or otherwise wrong, but cannot be changed.

In some versions of the source code annotation language, the typefix property can be used to override the declared C/C++ type. The interpretation of valid for the annotated value is obtained from the type given by the typefix instead of the declared C/C++ type. typefix can be used in conjunction with annotations on typedefs to customize the notions of validity associated with parameters. The meaning of the typefix property is described in Table 11 below.

TABLE 11

The typefix property

| Property | Meaning |
|---|---|
| typefix(ctype) | Annotates any value. States that if the value is annotated as valid, then it satisfies all of the properties of valid ctype values. ctype must be a visible C/C++ type at the program point where the annotation is placed. |

For example, legacy code may use void * or char * types for null-terminated string arguments. To take advantage of the valid property, it is useful to typefix these types to a type with a null-termination characteristic (e.g., the AsciiString example described above). The following example describes this use of the typefix property void use_string(typefix(AsciiString) valid void *stringarg)

Properties need not be limited to the set of properties described above. Versions of the source code annotation language may employ additional properties, omit some properties, vary the definitions of certain described properties, etc.

B. Examples

This section shows examples of how prototypes of some well-known buffer-related functions could be annotated using some versions of the source code annotation language. Annotations can vary from those shown in these examples.

For each prototype, we provide a verbose form, in which default annotations are made explicit, and a concise form, in which default annotations are omitted. In these examples, default annotations are filled in by the following rules:

Annotations on results apply in the post state

All properties not explicitly stated are maybe

The byteCount(size) on the result is actually interpreted in the post state, because writableTo applies to the post state. Unless explicitly stated, sizes are interpreted in the same state as the annotation on which they appear. In this example, the pre and post byteCount(size) have the same interpretation, since the size is given by the value of the argument value size, which does not change as a result of the call.

1. malloc

The annotations on the result of malloc specify that the returned pointer could be null, but if it is non-null, it is writable to the byte count given by the parameter size. In this example, the annotations do not state anything about whether the memory pointed to by the return value is initialized, or whether the memory later needs to be freed.

```
post maybenull
post writableTo(pre byteCount(size))
extern void * malloc ( int size );
```

The concise annotations for malloc are:

```
writableTo(byteCount(size))
extern void * malloc ( int size );
```

2. memcpy

For memcpy, the annotations on the parameter dest state that on entry, it is a buffer writable to byteCount(num), and on exit, it is readable to byteCount(num), and valid. The annotations on the parameter src state that on entry the buffer is valid and readable to byteCount(num), and the contents of the buffer are not modified by the callee.

```
post aliased(dest)
void * memcpy (pre notnull
    pre notaliased(src)
    pre writableTo(pre byteCount(num))
    post readableTo(pre byteCount(num))
    post valid
    void * dest,
    pre valid
    pre readableTo(pre byteCount(num))
    pre deref readonly
    void * src,
    size_t num
    );
```

The concise annotations for memcpy are:

```
aliased(dest)
void * memcpy (notnull
    notaliased(src)
    writableTo(byteCount(num))
    post readableTo(byteCount(num))
    post valid
    void * dest,
    valid
    readableTo(byteCount(num))
    deref readonly
    void * src,
    size_t num
    );
```

3. strncpy

In strncpy, strSource is a null terminated string; this is stated by annotating the typedef on AsciiString and using typefix(AsciiString). typefix(AsciiString) is not qualified by pre or post; it applies in both states. strDest is a typical case of an output buffer. The preconditions for strDest state that it is notnull and is writableTo(elementCount(count)).

The output buffer (or result buffer) is not annotated with typefix(AsciiString) because, while it is possible, it is not guaranteed that the buffer is zero-terminated on exit. There is no postcondition for the number of readable bytes in the buffer, because that number would be given by min(elementCount(count),sentinel(0)). Although the min operation is not in the grammar of size specifications in some versions of the source code annotation language, other versions could account for operations such as min, in addition to other operations. Some versions of the language omit support for complex operators such as min where the fact that a function like strncpy cannot be annotated with simpler size specifications suggests that the function should in fact not be used. An alternative version of strncpy null-terminates the destination buffer.

```
typedef readableTo(sentinel(0)) char * AsciiString;
post aliased(strDest)
char * strncpy (pre notnull
    pre writableTo(pre elementCount(count))
    post valid
    char * strDest,
    typefix(AsciiString)
    pre valid
    pre deref readonly
    const char * strSource,
    size_t count
    );
```

The concise annotations for strncpy are:

```
aliased(strDest)
char * strncpy ( notnull
    writableTo(elementCount(count))
    post valid
    char * strDest,
    typefix(AsciiString)
    valid
    deref readonly
    const char * strSource,
    size_t count
    );
```

4. _read

The annotations on _read are similar to the annotations on memcpy, except that on exit, the readable byte count for the buffer is specified by the return value, as indicated using the special name return in the byteCount size description.

```
int _read (      int handle,
                 pre writableTo(byteCount(count))
                 post valid
                 post readableTo(byteCount(return))
                 void * buffer,
                 unsigned int count
                 );
```

C. Exemplary Semantics in One Version of the Source Code Annotation Language This section provides exemplary semantics to give a semi-formal, unambiguous meaning to annotations in one version of the source code annotation language. Other semantic rules and functions differing from those described in this example can be used in other versions of the language.

In this example, the annotation language consists of sequences of properties and qualifiers as defined above, except that this example uses lconst in place of readonly. The lconst qualifier differs from readonly in that it appears one dereference level above where the corresponding readonly would appear. This is a technical device to make it easier to define the exemplary semantic functions below. No explicit meaning is provided for except, because its effect is syntactic: first, all occurrences of except in a sequence of annotations are processed; then, a meaning is assigned to the resulting annotation sequence.

We assume an evaluation function Env: Sym->Locs for symbols that maps them into locations. The environment function is assumed to be implicit in this example, since in all contexts there is only one environment of interest.

Stores S: Loc->Val (map locations to values (locations are values)).

The meaning M of annotations on a function is the conjunction of the meanings of the return annotations and the annotations on each formal parameter applied to the appropriate store (either pre or post).

```
M : annotated_signature -> PreState * PostState -> bool
M[ReturnAnnotations type FunctionSymbol(Annotations1 formal1,
Annotations2 formal2, ... AnnotationsN formalN) (Si, Sf) =
    Post[ReturnAnnotations] (ReturnVal, Si, Sf)
    AND Pre[Annotations1] (Env(formal1), Si, Sf, Env(formal1))
    AND ...
    AND Pre[AnnotationsN](Env(formalN), Si, Sf, Env(FormalN))
```

The Pre and Post functions are predicates evaluating to either true or false, given the value to which they apply, a set of annotations, and a pre and post store.

```
Pre[notnull, ...](Val, Si, Sf, InitVal) =
    Val != NULL
    AND Pre[...](InitVal, Si, Sf, InitVal)
Pre[lconst, ...](Val, Si, Sf, InitVal) =
    for 0 <= i < writableTo(Val) . Si(Val+i) = Sf(Val+i)
    AND Pre[...](InitVal, Si, Sf, InitVal)
Pre[writableTo(limit), ...](Val, Si, Sf, InitVal) =
    bytesizeof(Buffer starting at Val, Si) >=
    LimitByteSize[limit](Val, Si, Si,
    Sf)
    AND Pre[...](InitVal, Si, Sf, InitVal)
Pre[readableTo(limit), ...](Val, Si, Sf, InitVal) =
    initializedbytes(Buffer starting at Val, Si) >=
    LimitByteSize[limit](Val,
    Si, Si, Sf)
    AND Pre[...](InitVal, Si, Sf, InitVal)
Pre[valid, ...] (Val, Si, Sf, InitVal) =
    valid(Val, Si)
    AND Pre[...](InitVal, Si, Sf, InitVal)
Post[notnull, ...](Val, Si, Sf, InitVal) =
    Val != NULL
    AND Pre[...](InitVal, Si, Sf, InitVal)
Post[lconst, ...](Val, Si, Sf, InitVal) =
    // informal
    for 0 <= i < writableTo(Val) .
    Val+i is not written in the continuation of
    the current program point.
    AND Pre[...](InitVal, Si, Sf, InitVal)
```

```
Post[writableTo(limit), ...](Val, Si, Sf, InitVal) =
    bytesizeof(Buffer Starting at Val, Sf) >=
    LimitByteSize[limit](Val, Sf,
    Si, Sf)
    AND Post[...](InitVal, Si, Sf, InitVal)
Post[readableTo(limit), ...](Val, Si, Sf, InitVal) =
    validbytes(Buffer Starting at Val, Sf) >=
    LimitByteSize[limit](Val, Sf,
    Si, Sf)
    AND Post[...](InitVal, Si, Sf, InitVal)
Post[valid, ...] (Val, Si, Sf, InitVal) =
    valid(Val, Sf)
    AND Post[...](InitVal, Si, Sf, InitVal)
```

Pre and Post set a bit indicating the store in which to do dereferences (and buffer lookups).

```
Pre[pre, ...] (Val, Si, Sf, InitVal) = Pre[...](Val, Si, Sf, InitVal)
Pre[deref, ...](Val, Si, Sf, InitVal) = Pre[...](Si(Val), Si, Sf, InitVal)
Pre[post, ...](Val, Si, Sf, InitVal) = Post[...](Val, Si, Sf, InitVal)
Post[pre, ...] (Val, Si, Sf, InitVal) = Pre[...](Val, Si, Sf, InitVal)
Post[deref, ...](Val, Si, Sf, InitVal) = Pre[...](Sf(Val), Si, Sf, InitVal)
Post[post, ...](Val, Si, Sf, InitVal) = Post[...](Val, Si, Sf, InitVal)
```

LimitByteSize[limit](Ptr, defaultStore, initialStore, finalStore) gives meaning to limit as a byte count in the given default store and for the buffer at Ptr. First, the store is selected in which to evaluate the limit expression (e.g., the explicit pre store, the explicit post store, or the default store):

```
LimitByteSize[pre ...](Ptr, S, Si, Sf) = LimitByteSize[...](Ptr, Si)
LimitByteSize[post ...](Ptr, S, Si, Sf) = LimitByteSize[...](Ptr, Sf)
LimitByteSize[...](Ptr, S, Si, Sf) = LimitByteSize[...](Ptr, S)
```

Next, the way in which the byte count is obtained is defined for the four ways in which a limit can be specified. If the limit is a byte index, then the mapping is that index. If the limit is an element index, the index is multiplied by the element size. If the limit is a sentinel, the index of the first occurrence is found. Finally, if the limit is an end pointer, then the start pointer (Ptr) is subtracted from the location obtained for the end pointer.

```
LimitByteSize[ByteCount (number)](Ptr, S) = Number[number](S)
LimitByteSize[ElementCount(number)](Ptr, S) = elementSize(Ptr) *
    Number[number](S)
LimitByteSize[Sentinel(int-const)](Ptr, S) = elementSize(Ptr) *
    (first-element-index(Ptr, int-const) + 1)
LimitByteSize[EndPointer(location)](Ptr, S) =
    Location[location](S) − Ptr
LimitByteSize[InternalPointer(location)](Ptr, S) =
    Location[location](S) − Ptr
```

The Number function gives meaning to number specs:

```
Number[constant-int](S) = constant-int
Number[number − 1](S) = Number[number](S) − 1
Number[location](S) = S(Location[location](S))
Number[readableBytes(location)](S) =
    readableBytes for buffer starting at the
    value of Location[location](S)
```

-continued

```
Number[readableElements(location)](S) =
readableBytes for buffer starting at
    the value of Location[location](S)
Number[writableBytes(location)](S) =
writableBytes for buffer starting at the
    value of Location[location](S)
Number[writableElements(location)](S) =
writableElements for buffer starting
    at the value of Location[location](S)
The Location[location](S) function maps locations into their values:
Location[... x](S) = Deref[...](Env(x), S)
    // lookup in given store S and then deref as many times as necessary.
    Deref[ ](Val, S) = Val
    Deref[* ...](Val, S) = Deref[...](S(Val), S)
```

II. Computing Environment

The techniques and tools described above can be implemented on any of a variety of computing devices and environments, including computers of various form factors (personal, workstation, server, handheld, laptop, tablet, or other mobile), distributed computing networks, and Web services, as a few general examples. The techniques and tools can be implemented in hardware circuitry, as well as in software 580 executing within a computer or other computing environment, such as shown in FIG. 5.

Figure 5:
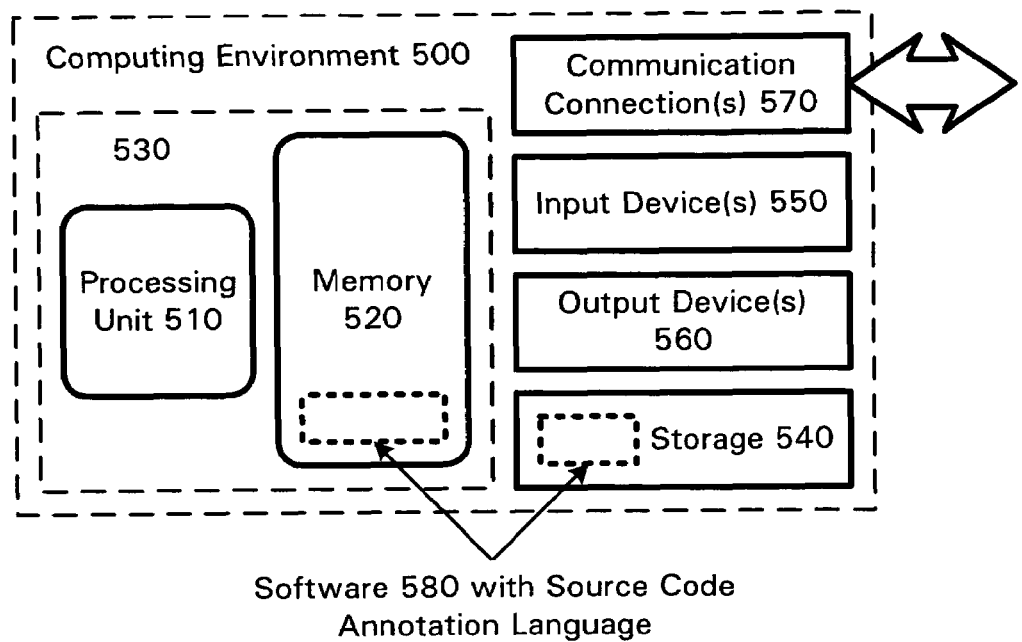
FIG. 5 is a block diagram of a suitable computing environment for implementing source code annotation language techniques and tools.

FIG. 5 illustrates a generalized example of a suitable computing environment 500 in which the described techniques and tools can be implemented. The computing environment 500 is not intended to suggest any limitation as to scope of use or functionality of the invention, as the present invention may be implemented in diverse general-purpose or special-purpose computing environments.

With reference to FIG. 5, the computing environment 500 includes at least one processing unit 510 and memory 520. In FIG. 5, this most basic configuration 530 is included within a dashed line. The processing unit 510 executes computer-executable instructions and may be a real or a virtual processor. In a multi-processing system, multiple processing units execute computer-executable instructions to increase processing power. The memory 520 may be volatile memory (e.g., registers, cache, RAM), non-volatile memory (e.g., ROM, EEPROM, flash memory, etc.), or some combination of the two. The memory 520 stores software 580 implementing a source code annotation language.

A computing environment may have additional features. For example, the computing environment 500 includes storage 540, one or more input devices 550, one or more output devices 560, and one or more communication connections 570. An interconnection mechanism (not shown) such as a bus, controller, or network interconnects the components of the computing environment 500. Typically, operating system software (not shown) provides an operating environment for other software executing in the computing environment 500, and coordinates activities of the components of the computing environment 500.

The storage 540 may be removable or non-removable, and includes magnetic disks, magnetic tapes or cassettes, CD-ROMs, CD-RWs, DVDs, or any other medium which can be used to store information and which can be accessed within the computing environment 500. For example, the storage 540 stores instructions for implementing software 580.

The input device(s) 550 may be a touch input device such as a keyboard, mouse, pen, or trackball, a voice input device, a scanning device, or another device that provides input to the computing environment 500. For audio, the input device(s) 550 may be a sound card or similar device that accepts audio input in analog or digital form, or a CD-ROM reader that provides audio samples to the computing environment. The output device(s) 560 may be a display, printer, speaker, CD-writer, or another device that provides output from the computing environment 500.

The communication connection(s) 570 enable communication over a communication medium to another computing entity. The communication medium conveys information such as computer-executable instructions, audio/video or other media information, or other data in a modulated data signal. By way of example, and not limitation, communication media include wired or wireless techniques implemented with an electrical, optical, RF, infrared, acoustic, or other carrier.

The techniques and tools described herein can be described in the general context of computer-readable media. Computer-readable media are any available media that can be accessed within a computing environment. By way of example, and not limitation, with the computing environment 500, computer-readable media include memory 520, storage 540, communication media, and combinations of any of the above.

Some of the techniques and tools herein can be described in the general context of computer-executable instructions, such as those included in program modules, being executed in a computing environment on a target real or virtual processor. Generally, program modules include functions, programs, libraries, objects, classes, components, data structures, etc. that perform particular tasks or implement particular abstract data types. The functionality of the program modules may be combined or split between program modules as desired. Computer-executable instructions may be executed within a local or distributed computing environment.

In view of the many possible embodiments to which the principles of our invention may be applied, we claim as our invention all such embodiments as may come within the scope and spirit of the following claims and equivalents thereto.

We claim:

1. In a computer system comprising a computer, a method of annotating computer program code stored on a computer-readable medium, the method comprising:
   inserting, by the computer, one or more in-line code annotations at one or more annotation targets in source code;
   wherein the one or more in-line code annotations comprise at least one annotation on a first pointer to a buffer, wherein the at least one annotation comprises a property that indicates a characteristic of the buffer, wherein the property that indicates the characteristic of the buffer takes a size argument, and wherein the size argument comprises a location of a second pointer associated with the buffer; and
   wherein the at least one annotation on the first pointer is placed in an argument list to a function call that uses the first pointer as a parameter.

2. The method of claim 1 wherein the characteristic is a readable extent of the buffer.

3. The method of claim 2 further comprising using the location of the second pointer associated with the buffer to determine the readable extent of the buffer.

4. The method of claim 1 wherein the characteristic is a writable extent of the buffer.

5. The method of claim 4 further comprising using the location of the second pointer associated with the buffer to determine the writable extent of the buffer.

6. The method of claim 1 wherein the at least one annotation includes an annotation prefix.

7. The method of claim 1 further comprising using the location of the second pointer associated with the buffer to determine size of the buffer.

8. The method of claim 1 wherein the second pointer associated with the buffer is an end pointer for the buffer.

9. The method of claim 1 wherein the second pointer associated with the buffer is an internal pointer for the buffer.

10. In a computer system comprising a computer, a method of annotating computer program code stored on a computer-readable medium, wherein the computer program code is operable to cause computer execution to perform according to instructions in the computer program code, the method comprising:
   inserting, by the computer, an annotation at a first value having a first value type in the computer program code;
   wherein the annotation comprises a first instance of a keyword, the first instance of the keyword indicating that the first value satisfies all usability properties necessary to allow a first function to rely on the first value, wherein other instances of the keyword identical to the first instance are operable to indicate that other values having different respective value types satisfy all usability properties necessary to allow functions to rely on the respective other values, wherein use of the keyword associates a pre-determined set of usability properties with a value type, and wherein the usability properties depend on the value type.

11. The method of claim 10 wherein the first value type is scalar, void, pointer, user-defined type, or struct.

12. The method of claim 10 wherein the first value is a reference parameter.

13. The method of claim 10 wherein the first value is a pointer, wherein an object pointed to by the pointer has one or more readable elements, the one or more readable elements of the object each having usability properties sufficient to allow the first function to rely on the one or more readable elements.

14. The method of claim 10 wherein the annotation further comprises an except qualifier.

15. The method of claim 10 wherein if the first value type is a pointer, the usability properties necessary to allow the first function to rely on the first value comprises the pointer pointing to a buffer with at least one readable element.

16. The method of claim 10 wherein if the first value type is a scalar, the usability properties necessary to allow the first function to rely on the first value comprises the scalar being initialized.

17. In a computer system comprising a computer, a method of annotating computer program code stored on a computer-readable medium, the method comprising:
   inserting, by the computer, an annotation having an annotation argument comprising a second value type in the computer program code, wherein the annotation annotates a variable having a first value type;
   wherein the annotation changes the first value type of the variable to the second value type of the annotation argument.

18. The method of claim 17 wherein the first value type is a legacy value type.

19. The method of claim 17 wherein the second value type has a null-termination characteristic.

20. The method of claim 17 wherein the second value type must be a visible type at program point where the annotation is placed.

21. In a computer system comprising a computer, a method of annotating computer-executable program code stored on a computer-readable medium, the method comprising:
   adding, by the computer, an annotation to a pointer in the computer-executable program code, wherein the annotation describes transferring buffer properties from a second pointer to the pointer; and
   including a location parameter with the annotation, wherein the location parameter describes a logical buffer pointed to by the pointer.

22. One or more computer-readable storage media having encoded thereon computer-executable instructions for performing a method of annotating computer program source code, the method comprising:
   inserting, by a computer, one or more in-line code annotations at one or more annotation targets in the computer program source code;
   wherein the one or more in-line code annotations comprise at least one annotation on a first pointer to a buffer, wherein the at least one annotation comprises a property that indicates a characteristic of the buffer, wherein the property that indicates the characteristic of the buffer takes a size argument, and wherein the size argument comprises a location of a second pointer associated with the buffer; and
   wherein the at least one annotation on the first pointer is placed in an argument list to a function call that uses the first pointer as a parameter.

23. One or more computer-readable storage media having encoded thereon computer-executable instructions for performing a method of annotating computer program source code, the method comprising:
   inserting, by a computer, an annotation at a first value having a first value type in the computer program source code;
   wherein the annotation comprises a first instance of a keyword, the first instance of the keyword indicating that the first value satisfies all usability properties necessary to allow a first function to rely on the first value, wherein other instances of the keyword identical to the first instance are operable to indicate that other values having different respective value types satisfy all usability properties necessary to allow functions to rely on the respective other values, wherein use of the keyword associates a pre-determined set of usability properties with a value type, and wherein the usability properties depend on the value type.

24. One or more computer-readable storage media having encoded thereon computer-executable instructions for performing a method of annotating computer program source code stored on a computer-readable medium, the method comprising:
   inserting, by a computer, an annotation having an annotation argument comprising a second value type in the computer program source code, wherein the annotation annotates a variable having a first value type;
   wherein the annotation changes the first value type of the variable to the second value type of the annotation argument.

* * * * *

UNITED STATES PATENT AND TRADEMARK OFFICE
CERTIFICATE OF CORRECTION

PATENT NO. : 7,584,458 B2
APPLICATION NO. : 10/679254
DATED : September 1, 2009
INVENTOR(S) : Das et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1063 days.

Signed and Sealed this

Fourteenth Day of September, 2010

David J. Kappos
*Director of the United States Patent and Trademark Office*